Aug. 6, 1946.  F. E. VALENTINE  2,405,473
CAM GEAR STRUCTURE
Filed Oct. 24, 1942  2 Sheets-Sheet 1
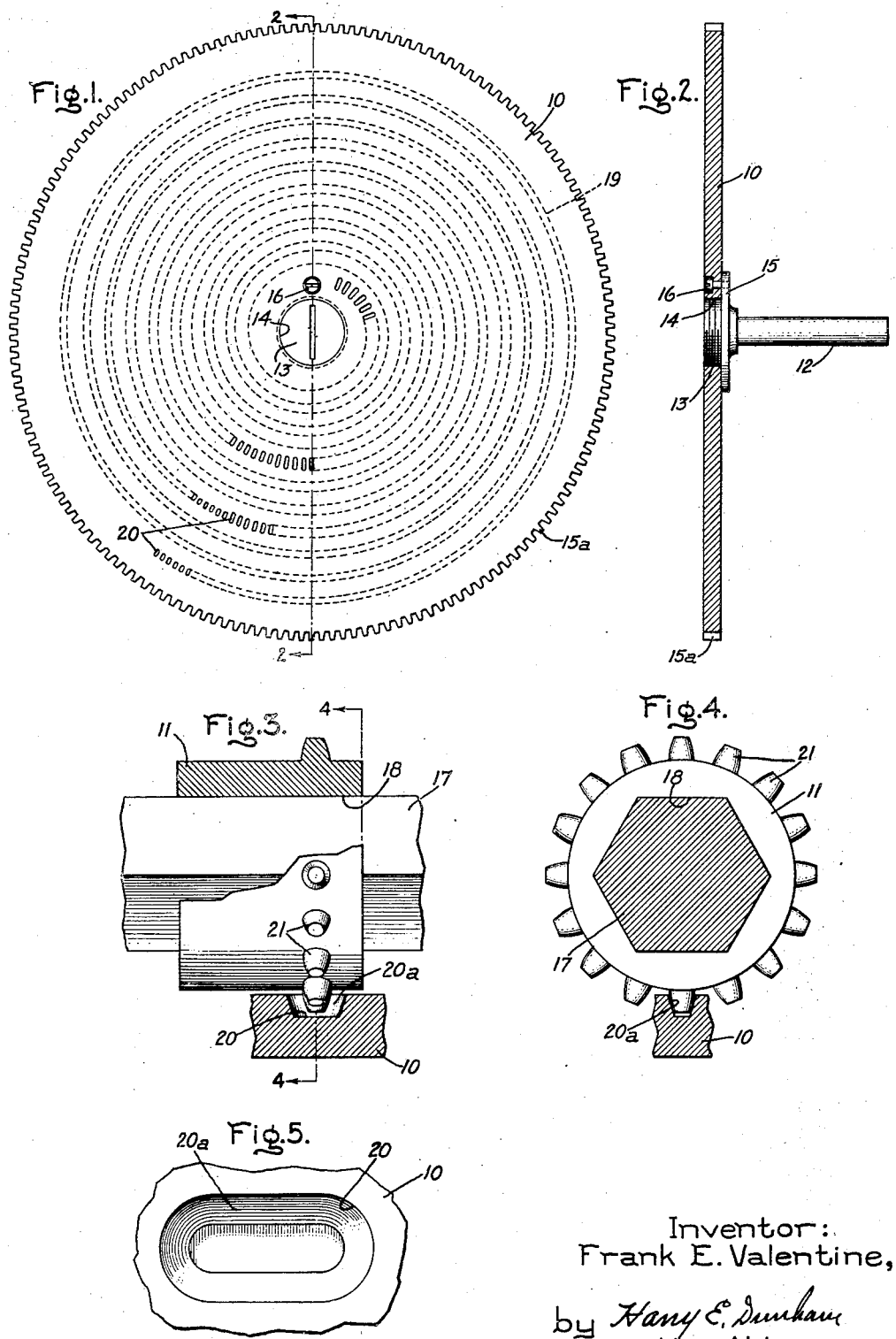
Inventor:
Frank E. Valentine,
by Harry E. Dunham
His Attorney.

Aug. 6, 1946.   F. E. VALENTINE   2,405,473
CAM GEAR STRUCTURE
Filed Oct. 24, 1942   2 Sheets-Sheet 2
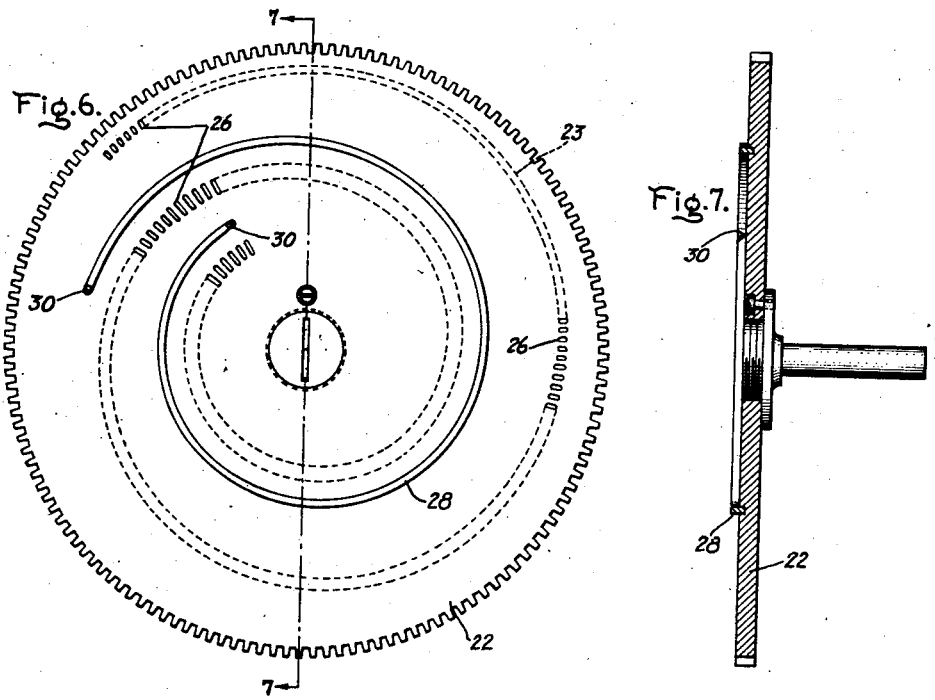
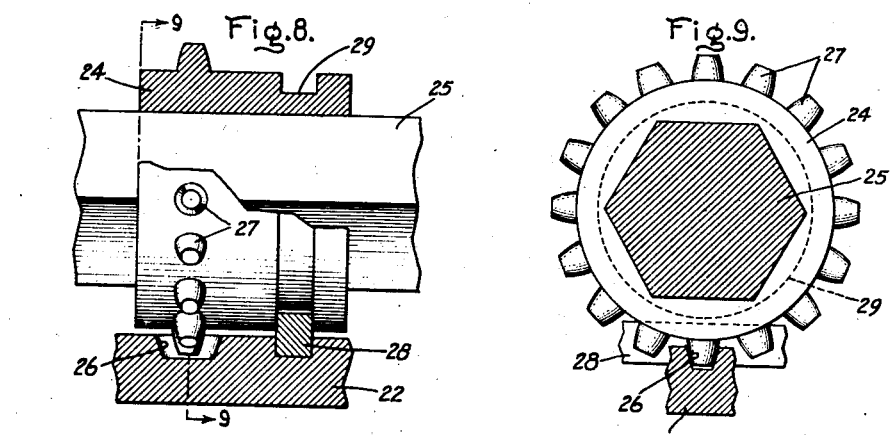
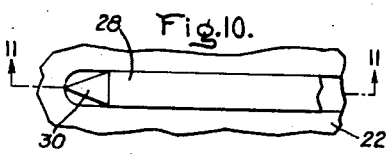
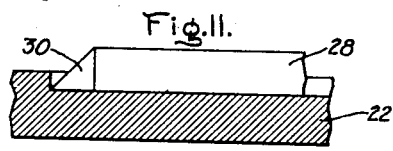
Inventor:
Frank E. Valentine,
by Harry E. Dunham
His Attorney.

Patented Aug. 6, 1946

2,405,473

UNITED STATES PATENT OFFICE 2,405,473

CAM GEAR STRUCTURE

Frank E. Valentine, Schenectady, N. Y., assignor to General Electric Company, a corporation of New York Application October 24, 1942, Serial No. 463,163

6 Claims. (Cl. 74—424.5)

This invention relates to cam gear structures, and it has for its general object the provision of an improved structure of this character.

More specifically, this invention relates to gear structures which have a rotatably mounted disk upon the face of which is arranged a gear rack with which a pinion co-acts.

Cam structures of this general type are known, and are used for a variety of purposes, such as calculating the functions of a variable. But in the main, these structures have been more or less unsatisfactory, particularly where it has been attempted to use them for calculating non-linear functions of a basic variable. This is because in such cases, the rack on the disk is not a straight line or a circle, but is in the form of a curve whose radius changes continuously—such as a spiral. It has been difficult to produce such a cam structure that will give accurate results, that is, that will always give the exact speed ratio that is desired between the cam and its pinion; it has not been possible to make them by simple and inexpensive manufacturing processes; and in most cases it has been difficult to cause the pinion to traverse the disk.

This invention contemplates an improved cam structure wherein these disadvantages are obviated.

In accordance with this invention, the rack on the disk is of the involute type. And preferably, the teeth will be formed by means of slots, properly shaped, depressed in the face of the disk. The pinion that co-acts with the cam is provided with teeth in the form of projecting pins that inter-engage with the teeth of the rack. These projecting pins are in the form of an involute of revolution so that irrespective of the position of the pinion with reference to the disk an exact speed ratio between the cam and the pinion is obtained. Moreover, the teeth of the pinion and rack co-act in such a way that they tend to move the pinion transversely across the face of the disk. In addition, because of their simple involute formation, the teeth on both the rack and pinion are easy to make by well-known means and processes.

For a more complete understanding of this invention, reference should be had to the accompanying drawings in which Fig. 1 is a plan view of the disk element of gear structure embodying this invention; Fig. 2 is a sectional view taken through the line 2—2 of Fig. 1 and looking in the direction of the arrows; Fig. 3 is a fragmentary view illustrating the pinion element of the cam structure of this invention and the way in which it co-acts with the disk element, the figure being drawn to a larger scale than Figs. 1 and 2; Fig. 4 is a sectional view taken through the line 4—4 of Fig. 3 and looking in the direction of the arrows; Fig. 5 is an enlarged fragmentary plan view showing one of the teeth that are formed in the disk element; Fig. 6 is a plan view of a disk element of the gear structure illustrating a modified form of this invention; Fig. 7 is a sectional view taken through the line 7—7 of Fig. 6 and looking in the direction of the arrows; Fig. 8 is a fragmentary view illustrating the pinion element of the gear structure and the way it co-acts with the cam element shown in Figs. 6 and 7; Fig. 9 is a sectional view taken through the line 9—9 of Fig. 8 and looking in the direction of the arrows; Fig. 10 is an enlarged fragmentary plan view of a portion of the disk of Figs. 6 and 7 and illustrating a guide track that is used in this embodiment of this invention to guide the movement of the pinion with reference to the disk; and Fig. 11 is a sectional view taken through the line 11—11 of Fig. 10 and looking in the direction of the arrows.

Referring more particularly to Figs. 1-5 inclusive, this invention has been shown in one form as applied to cam gear structure comprising a disk 10, which in this case constitutes a driving member, and a co-acting pinion 11 which here constitutes the driven member.

The disk 10 is secured to a supporting shaft 12 which will be mounted in a suitable bearing (not shown) for rotatably supporting the disk. The shaft is provided with a threaded end section 13, and the disk is provided with a central threaded aperture 14 that is threaded upon the end section. Also, the shaft carries a plate 15 rigidly secured to it and to which the disk is secured by means of a screw 16. The screw functions as an indexing means so that the disk will always be secured to the shaft 12 in the same relation. The shaft 12 also may be used to drive the disk, but it is preferred to drive it by other means, such as by means of a driving pinion (not shown) that meshes with spur gear teeth 15a formed on the periphery of the gear.

The pinion 11 which co-acts with the disk 10 is mounted upon a shaft 17, the shaft, as shown, having a hexagonal cross-section and the pinion being provided with a complementary opening 18 fitted to the shaft. The shaft 17 extends crosswise of the disk, and in a diameter thereof, but it may be located at one side of the center, if desired.

The disk 10 is provided with a rack 19, the teeth 20 of which inter-engage with teeth 21 provided on the pinion 11. The teeth 20 of the rack are true involute teeth, and as shown more clearly in Figs. 3, 4 and 5, they have the form of slots depressed in the surface of the disk. Also, as shown more clearly in Fig. 5, the straight involute tooth engaging surfaces 20a of the teeth 20 are in the form of an elongated oval which has its long axis positioned generally radially of the disk. The teeth 21 of the pinion 11 which inter-engage with the teeth 20 of the rack are similar to each other, and each is in the form of a true involute of revolution.

Because of the shape given the inter-engaging teeth 20 and 21 there will always be two true involute tooth surfaces in inter-engagement, irrespective of the relative positions of the pinion 11 and disk 10. Therefore, the exact desired speed ratio is obtained between disk 10 and shaft 17 in all positions of the pinion relative to the disk.

The rack 19, as shown, is in the form of a uniform spiral with its center in the axis of the disk; also as here shown the spiral has a rather flat lead. In this case, a further advantage of the arrangement of the involute shapes given the teeth 20 and 21 is that as the cam 10 is rotating its teeth 20 will act upon the teeth 21 of the pinion 11 not only to rotate the pinion on its axis but also to cause it to traverse the disk.

It is also to be noted that where the rack 19 has such a shape, it is necessary to increase the lengths of the teeth 20 as they approach the center of the disk, because the pinion as it approaches the center has to move a greater distance radially for a given angular movement of the disk.

As has been pointed out previously, the cam structure of this invention may be used for a variety of purposes. In the particular embodiment of the invention shown in Figs. 1–5, the apparatus will calculate non-linear functions of a basic variable. Thus, for example, where the rack 19 is in the form of a uniform spiral, as shown, the shaft 17 will be operated so that its movement is proportional to the square of the function which is turned in by the cam 10.

In the form of the invention shown in Figs. 6–11, the cam 22 is provided with a non-uniform spiral rack 23 having relatively few widely spaced apart turns.

Here it is contemplated that the movement of the cam 22 will be in accordance with the magnitude of a certain angle $\theta$, and that the pinion 24 co-acting with the cam will be driven thereby so that the movement of the pinion shaft 25 will measure a function of $\sin \theta$; that is, if the cam 22 is moved through the angle $\theta$, the shaft 25 will be moved to generate a predetermined function of $\sin \theta$.

Here, also, the rack teeth 26 of the cam and the teeth 27 of the pinion are shaped as are the corresponding teeth 20 and 21 of the first form of the invention described.

The outer turns of the spiral 23 have a lead that is so flat that the inter-engagement between the teeth 26 and 27 will traverse the pinion across the face of the disk. But the lead of the inner turns of the spiral is so steep that the inter-engagement between these teeth will not traverse the pinion across the face of the cam 22 solely by their own inter-action. Therefore, I have provided auxiliary means for assisting in traversing the pinion at these portions of the spiral where its lead is the steepest. This means comprises a track 28 which is spaced from, but arranged in parallel relation to these sections of the spiral.

The pinion is provided with a groove 29 which receives the track, as shown more clearly in Fig. 8, so that the pinion is forcibly guided across the face of the disk. The track at its two ends is provided with inclined sections 30, as more clearly shown in Figs. 10 and 11, which guide and direct the groove 29 onto the track when the pinion reaches the track at either end.

While two rack shapes have been shown to solve two particular problems, it will be understood that the rack may be given any suitable shape, the shape depending, of course, upon the speed ratios desired between the driving cam and driven pinion shaft.

Also, it is to be understood that while in each case it has been assumed that the disk is the driving member, the pinion may be the driving member, and the disk the driven member.

While I have shown particular embodiments of my invention, it will be understood, of course, that I do not wish to be limited thereto since many modifications may be made, and I, therefore contemplate by the appended claims to cover any such modifications as fall within the true spirit and scope of my invention.

What I claim as new and desire to secure by Letters Patent of the United States is:

1. Gear cam structure comprising a disk, a rack of predetermined form on said disk formed with involute teeth, and a pinion co-acting with said disk provided with teeth inter-engaging with those of said rack, said pinion teeth being in the form of an involute of revolution.

2. Gear cam structure comprising a disk, means for rotating said disk, a rack on said disk having a predetermined curvature and having teeth that are relatively elongated in the radial direction, and a pinion having teeth in the form of an involute of revolution co-acting with those of said rack, the inter-engagement of said teeth functioning both to rotate said pinion and to traverse it across the face of said disk.

3. Gear cam structure comprising a disk, a rack of predetermined form on said disk formed by teeth that are depressed in the face of said disk and which are involute in character, a pinion co-acting with said disk having outwardly projecting pin-like teeth inter-engaging those of said rack, said teeth on said pinion being in the form of an involute of revolution.

4. Gear cam structure comprising a disk, a rack of predetermined form on said disk formed by teeth that are depressed in the face of said disk and which are involute in character, a pinion co-acting with said disk having outwardly projecting pin-like teeth inter-engaging those of said rack, said teeth on said pinion being in the form of an involute of revolution, a shaft mounting said pinion for rotation on a fixed axis extending across the face of said disk, and a track on said disk in substantially parallel relation with said rack inter-engaging said pinion to assist in traversing it across the face of said disk.

5. Gear cam structure comprising a disk, a spiral rack on said disk formed of teeth that are depressed in the face of the disk and which are involute in character, means mounting said disk for rotation on a fixed axis, a pinion co-acting with said disk having outwardly projecting pin-like teeth inter-engaging those of said rack, said teeth on said pinion being in the form of an involute of revolution, a shaft mounting said pinion for rotation on a fixed axis extending across the face of said disk, and a track on said disk in substantially parallel relation with said rack inter-engaging said pinion to assist in traversing it across the face of said disk.

6. Gear cam structure comprising a disk, a rack of predetermined form on said disk formed by teeth that are depressed in the face of said disk and which are involute in character, the operating faces of said teeth also being formed into an elongated ellipse the larger axis of which is positioned generally radially of said disk, a pinion co-acting with said disk having outwardly projecting pin-like teeth inter-engaging those of said rack, said teeth on said pinion being in the form of an involute of revolution.

FRANK E. VALENTINE.